(12) United States Patent
McLeod (10) Patent No.: US 9,221,702 B2
(45) Date of Patent: Dec. 29, 2015

(54) PROCESS FOR ENHANCED TOTAL ORGANIC CARBON REMOVAL WHILE MAINTAINING OPTIMUM MEMBRANE FILTER PERFORMANCE

(71) Applicant: CLEARLOGX, INC., Greenwood Village, CO (US)

(72) Inventor: Gregg A. McLeod, Greenwood Village, CO (US)

(73) Assignee: H2O INNOVATION INC., Québec (CA)

(*) Notice: Subject to any disclaimer, the term of this patent is extended or adjusted under 35 U.S.C. 154(b) by 305 days.

(21) Appl. No.: 13/912,622

(22) Filed: Jun. 7, 2013

(65) Prior Publication Data

US 2013/0299426 A1    Nov. 14, 2013

Related U.S. Application Data

(60) Division of application No. 12/545,584, filed on Aug. 21, 2009, now Pat. No. 8,491,794, which is a continuation-in-part of application No. 11/975,835, filed on Oct. 23, 2007, now Pat. No. 8,491,788.

(60) Provisional application No. 61/196,918, filed on Oct. 22, 2008.

(51) Int. Cl.
C02F 1/44     (2006.01)
B01D 61/58    (2006.01)
(Continued)

(52) U.S. Cl.
CPC .............. *C02F 9/00* (2013.01); *B01D 61/145* (2013.01); *B01D 61/147* (2013.01); *B01D 61/16* (2013.01); *B01D 61/22* (2013.01); *B01D 65/08* (2013.01); *C02F 1/008* (2013.01); *C02F 1/444* (2013.01); *B01D 2311/04* (2013.01);
(Continued)

(58) Field of Classification Search
None
See application file for complete search history.

(56) References Cited

U.S. PATENT DOCUMENTS 3,846,293 A * 11/1974 Campbell ................ 210/631
4,610,792 A    9/1986 Van Gils et al.
(Continued)

FOREIGN PATENT DOCUMENTS

CN    1827535 A    9/2006
CN    101258107 A  9/2008
(Continued)

OTHER PUBLICATIONS

Dong et al. "Effect of pH on UF Membrane Fouling". Desalination 195 (2006) 201-208.
(Continued)

*Primary Examiner* — Krishnan S Menon
(74) *Attorney, Agent, or Firm* — Jeffrey G. Degenfelder; Carstens & Cahoon, LLP (57) ABSTRACT

A system and process for enhancing total organic carbon ("TOC") removal from raw, untreated water while maintaining optimum membrane filter performance. The present invention overcomes many of the disadvantages of prior art water filtration systems by controlling the pH level of the water, prior to the water being directed through said membrane filter, so that the particulate charge of the water aligns with the electromagnetic surface charge of membrane filter. Maintaining the particulate charge of the water within an optimum charge window for the particular membrane filter enhances the membrane filter's performance by decreasing the fouling rate of the membrane filter.

17 Claims, 3 Drawing Sheets

(51) Int. Cl.

| | | |
|---|---|---|
| *B01D 61/12* | (2006.01) | |
| *C02F 9/00* | (2006.01) | |
| *B01D 61/14* | (2006.01) | |
| *B01D 61/16* | (2006.01) | |
| *B01D 61/22* | (2006.01) | |
| *B01D 65/08* | (2006.01) | |
| *C02F 1/00* | (2006.01) | |
| *C02F 1/52* | (2006.01) | |
| *C02F 1/66* | (2006.01) | |

(52) U.S. Cl.
CPC ........ *B01D 2311/10* (2013.01); *B01D 2311/14* (2013.01); *B01D 2311/16* (2013.01); *B01D 2311/18* (2013.01); *B01D 2311/246* (2013.01); *B01D 2315/06* (2013.01); *B01D 2321/04* (2013.01); *B01D 2321/162* (2013.01); *B01D 2321/164* (2013.01); *B01D 2321/22* (2013.01); *C02F 1/5236* (2013.01); *C02F 1/66* (2013.01); *C02F 2209/02* (2013.01); *C02F 2209/03* (2013.01); *C02F 2209/06* (2013.01); *C02F 2209/20* (2013.01); *C02F 2209/40* (2013.01); *C02F 2301/08* (2013.01)

(56) References Cited

U.S. PATENT DOCUMENTS

| | | | |
|---|---|---|---|
| 5,200,086 A * | 4/1993 | Shah et al. | .................... 210/708 |
| 5,871,648 A | 2/1999 | Allen et al. | |
| 6,027,649 A | 2/2000 | Benedek et al. | |
| 6,113,797 A | 9/2000 | Al-Samadi | |
| 6,258,278 B1 | 7/2001 | Tonelli et al. | |
| 6,267,891 B1 | 7/2001 | Tonelli et al. | |
| 6,312,601 B1 | 11/2001 | Allen et al. | |
| 6,428,705 B1 | 8/2002 | Allen et al. | |
| 6,974,544 B1 | 12/2005 | Langlais | |
| 2002/0088758 A1 | 7/2002 | Blumenschein et al. | |
| 2002/0113023 A1 | 8/2002 | Krulik et al. | |
| 2004/0065613 A1 | 4/2004 | Cadera et al. | |
| 2004/0129639 A1 | 7/2004 | Allen et al. | |
| 2004/0168989 A1 | 9/2004 | Tempest | |
| 2004/0188352 A1 | 9/2004 | Dey et al. | |
| 2005/0000895 A1 | 1/2005 | Cadera et al. | |
| 2006/0231491 A1 | 10/2006 | Mukhopadhyay | |
| 2007/0080112 A1 | 4/2007 | Langlais | |
| 2009/0101578 A1 | 4/2009 | McLeod | |
| 2010/0224555 A1 * | 9/2010 | Hoek et al. | ................ 210/500.42 |

FOREIGN PATENT DOCUMENTS

| | | |
|---|---|---|
| EP | 1094038 A1 | 4/2001 |
| JP | 05068993 A | 3/1993 |
| KR | 10-2007-0028600 B1 | 6/2007 |
| WO | 2007028894 A1 | 3/2007 |

OTHER PUBLICATIONS

Leeuwen et al. "Modeling the Treatment of Drinking Water to Maximize Dissolved Organic Matter Removal and Minimize Disinfection by-product Formation". Desalination 176 (2005) 81-89.

Liu et al. "Fuzzy Control of Coagulation Reaction Through Streaming Current Monitoring". Wat. Sci. Tech. vol. 36 No. 4 pp. 127-134. © 1997 Elsevier Science Ltd.

Qin et al. "Impact of Coagulation pH on Enhanced Removal of Natural Organic Matter in Treatment of Reservoir Water". Separation and Purification Technology 49 (2006) 295-298.

Teixeira et al. "pH Adjustment for Seasonal Control of UF Fouling by Natural Waters". Desalination 151 (2002) 165-175.

Xia et al. "Ultrafiltration of Surface Water with Coagulation Pretreatment by Streaming Current Control". Desalination 204 (2007) 351-358.

\* cited by examiner

PROCESS FOR ENHANCED TOTAL ORGANIC CARBON REMOVAL WHILE MAINTAINING OPTIMUM MEMBRANE FILTER PERFORMANCE

CROSS-REFERENCE TO RELATED APPLICATIONS

This application is a divisional application of, and claims the benefit of priority under 35 U.S.C. §120 to, U.S. patent application Ser. No. 12/545,584, filed on Aug. 21, 2009, now U.S. Patent No. 8,491,794, which is a continuation-in-part application of U.S. patent application Ser. No. 11/975,835, filed on Oct. 23, 2007, now U.S. Patent No. 8,491,788. This application also claims the benefit of priority under 35 U.S.C. §119 to U.S. Provisional Patent Application Ser. No. 61/196,918 filed on Oct. 22, 2008. The disclosure of each of the above-identified applications is hereby incorporated herein by reference in its entirety for all purposes.

BACKGROUND OF THE INVENTION

1. Technical Field of the Invention

The present invention relates to a process for enhancing the removal of total organic carbon from a water supply while optimizing the performance of a membrane filtration system.

2. Description of Related Art

Increasingly, municipal drinking water and wastewater filtration facilities utilize membrane microfiltration or ultrafiltration systems as a means of filtering ground water, surface water and wastewater sources ("source water"). Such filtration systems typically utilize a semi-permeable membrane device to filter or reject organic, inorganic and microscopic particulates as water is passed through them. As source water is passed through the membrane filter barrier under hydrostatic pressure, particulate debris (i.e., suspended solids and solutes of high molecular weight) accumulates on the membrane surface and is retained or filtered from the water, while water and low molecular weight solutes pass through the membrane. Typically, insoluble particulates sized larger than 0.04-0.1 microns are filtered or rejected while soluble contaminants or insoluble particulates and ions less than 0.04-0.1 microns pass through the membrane filter.

To function efficiently, it is important that the membrane filter is kept clean. The membrane is, therefore, periodically backwashed to remove the particulate buildup. Accumulated particulates that are not readily removed during backwashing must be removed by chemical cleaning techniques. Such techniques, commonly known as clean in place (CIP) and/or chemical maintenance wash procedures, involve exposing the membrane to chemicals such as caustic soda, sodium hypochlorite (chlorine), various acids and other chemical products to remove the build-up of organic and inorganic compounds. However, chemical cleaning techniques are much more time consuming when compared to backwashing alone. Moreover, the harsh chemicals used in chemical cleaning techniques tend to degrade and deteriorate the membrane filter element over time.

The performance of a filtration membrane is dictated by the fouling rate of the influent contaminants. Fouling is the buildup of organic and inorganic particulates on the membrane surface that are not readily removed during periodic backwashing. As the fouling rate of a membrane filter element increases, chemical maintenance wash procedures are more frequently required. Most membrane filtration systems operate without any additional cleaning processes or chemical treatment past the backwashing and chemical cleaning as described in the above paragraph. Thus, in order to optimize the performance of a filtration membrane it is desirable to minimize the fouling rate of the filtration membrane.

One type of contaminant in water supplies that increases the fouling rate of filtration membranes is total organic carbon ("TOC"). TOC levels vary in water supplies from very pristine (i.e., low levels of TOC) to very contaminated (i.e., high levels of TOC). Higher levels of TOC contribute to taste and odor problems and the formation of disinfection byproducts ("DBP") such as halo-acetic acid ("HAA") and total tri-halo methane ("TTHM"). HAAs and TTHMs are created when chlorine reacts with soluble organics and are typically formed when chlorine in the water reacts with soluble TOC in the water distribution system (e.g., a collection of pipes that delivers filtered water to homes and businesses). Reducing the level of TOC, particularly the soluble TOC, in the raw water alleviates the taste and odor problems and minimizes the formation of DBPs.

TOC consists of both soluble and insoluble compounds. However, membrane filtration alone only removes the insoluble component of TOC. A common method for removing the soluble component of TOC includes introducing a chemical coagulant into the water stream and providing adequate mixing and detention prior to membrane filtration. Metal salt-based coagulants react with soluble organics via a process known as "charge neutralization," which causes a portion of the soluble organic compounds to precipitate out of solution thereby allowing them to be filtered out of the water. The metal base of these coagulants is generally aluminum or iron. Several chemical coagulants can provide this chemical reaction, such as aluminum sulfate, ferric chloride, ferric sulfate, poly-aluminum chloride and aluminum chlorhydrate.

The removal of TOC by coagulants can be further increased by adjusting the pH of the water. Generally, the lower the pH, the greater the TOC removal. For example, when a coagulant is dosed into a water stream, and the pH is depressed chemically to a desired level and maintained (example: pH≈5.5), a higher level of TOC removal can be achieved.

Prior art methods have previously assumed that the pH set point for optimal organic removal is the same for optimum membrane performance, but this is not necessarily true. Optimum membrane performance can be defined as continuous filtration with 1) the lowest pressure rise across the membrane, measured as trans-membrane pressure (TMP); and 2) the lowest chemical cleaning requirement.

The trans-membrane pressure (TMP) is generally a function of the force which drives liquid flow through a cross flow membrane (TMP={(feed pressure+retentate pressure)/2}−permeate pressure), whereas the lowest chemical cleaning requirement is a simply a function of minimizing the fouling rate of the membrane. During filtration, the feed side of the membrane is under higher pressure than the permeate side. This pressure difference forces liquid through the membrane. Consequently, rising TMP is an indicator of membrane fouling.

Prior art methods to remove TOC include 1) installing a process after membrane filtration such as granular activated carbon (GAC) adsorption, 2) dosing a chemical coagulant prior to membrane filtration without controlling pH, 3) only controlling pH ahead of a liquids-solids separator prior to membrane filtration, 4) only controlling pH for organic removal, 5) installing an ion exchange process before membrane filtration, or 6) installing a nano filtration or reverse osmosis process after membrane filtration. Thus, an improved process for water filtration, which enhances TOC removal while optimizing membrane filter performance, is desirable.

SUMMARY OF THE INVENTION

The present invention involves a system and process for enhancing total organic carbon ("TOC") removal from raw, untreated water while maintaining optimum membrane filter performance. The present invention overcomes many of the disadvantages of prior art water filtration systems by controlling the electromagnetic particulate charge in order to enhance membrane filter performance by decreasing the fouling rate of the membrane.

Fouling is the buildup of organic and inorganic particulates on the membrane surface that are not readily removed during periodic backwashing. It has been found that these particulates, as well as the membrane surface, possess a micro amp charge. When the electromagnetic charge of the particulates aligns with electromagnetic charge of the membrane surface, there is no electromagnetic attraction and the filtered particulates are easily removed from the membrane surface during backwashing. However, when the electromagnetic charge of the particulates does not align with the membrane surface charge, the particulates are attracted to the membrane surface and not readily removed by backwashing, resulting in fouling of the membrane. The rate of fouling can be attributed to the difference in charge between the particulate and the membrane surface. By adjusting the pH of the water, the electromagnetic charge of these particulates may be altered and made to align with the membrane surface charge, thereby reducing fouling of the membrane and improving the membrane's performance.

In one embodiment, the system comprises a two-stage process in which the electromagnetic particulate charge of the water is controlled in the second stage by adjusting the amount of acid or base added to the water prior to membrane filtration. In the first stage of the process, a coagulant is dosed and the pH of the water is controlled in order to achieve maximum TOC removal during liquids-solids filtration. Utilizing this two-stage process allows the total system to operate more effectively and further achieves maximum TOC removal and optimum membrane performance.

In a second embodiment, the system of the present invention comprises a single stage or direct feed mode wherein the pH/electromagnetic charge level is controlled so that water dosed with a coagulant may bypass a clarifier and proceeds directly to the membrane filtration system. In a direct feed mode, coagulant is dosed ahead of a mixing system. The pH and electromagnetic particulate charge of the water may be controlled by means of pH control, micro amp streaming current control, pH control with temperature correction and/or TMP/Resistance/Permeability control. Any one or a combination of these control mechanisms may be utilized to maintain an optimum set point by adjusting the acid or base dosing levels. In general, the pH and electromagnetic particulate charge of the water are maintained at levels that achieve as much TOC removal as possible while optimizing membrane performance.

The filtration system of the present invention may further include a computerized master control system, which continually monitors the filtration system and automatically adjusts the acid and base dosing levels and the amount of coagulants added to the water based on a number of criteria. The master control system allow the filtration system to be fine tuned during operation so as to enhance the total organic carbon ("TOC") removal from raw, untreated water while maintaining optimum membrane filter performance The above as well as additional features and advantages of the present invention will become apparent in the following written detailed description.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

Where used in the various figures of the drawing, the same numerals designate the same or similar parts. Furthermore, when the terms "top," "bottom," "first," "second," "upper," "lower," "end," "side," "horizontal," "vertical," and similar terms are used herein, it should be understood that these terms have reference only to the structure shown in the drawing and are utilized only to facilitate describing the invention.

All figures are drawn for ease of explanation of the basic teachings of the present invention only; the extensions of the figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

DETAILED DESCRIPTION OF THE INVENTION

The present invention comprises a process and system for enhancing total organic carbon ("TOC") removal from raw, untreated water while maintaining optimum membrane filter performance. The present invention enhances membrane filter performance by decreasing the fouling rate of the membrane filter.

Fouling is the buildup of organic and inorganic particulates on the membrane surface that are not readily removed during periodic backwashing. It has been found that low pressure membrane fouling can be caused by organic and inorganic particulates coming into contact with the membrane surface. It has been determined that these particulates, as well as the membrane surface, possess a micro amp charge. It has been further determined that the micro amp charge of particulates does not always align with the natural surface charge of the membrane surface.

While the surface charge of the filtration membrane is fairly constant, the electromagnetic particulate charge is more variable depending on factors such as coagulant dose, pH changes, temperature, particle size, etc. It is, therefore, important to control or "align" the particulate charge with the membrane surface charge. By "align" is meant controlling the particulate charge so that it matches the membrane surface charge. In accordance with the system and process of the present invention, this aligning is accomplished by controlling the acid or base feed to maintain the desired particulate charge so that it matches the surface charge of the membrane. When the electromagnetic particulate charge aligns with the membrane surface charge, electromagnetic attraction is ceased, and the filtered particulates are easily removed from the membrane surface during backwashing. However, when the electromagnetic particulate charge does not align with the membrane surface charge, the particulates are attracted to the membrane surface and fouling occurs.

The rate of fouling can be attributed to the difference in electromagnetic charge between the particulates and the membrane surface. By adjusting the pH of the water, the electromagnetic charge of these particulates may be altered and made to align with the electromagnetic charge of the membrane surface, thereby reducing fouling of the membrane and improving the membrane's performance.

In accordance with the process and system of the present invention, the particulate charge is controlled such that the micro amp charge of the particulates, aligns with the membrane surface charge, thereby allowing the filtered particulates to be easily removed from the membrane surface during backwashing.

Figure 1:
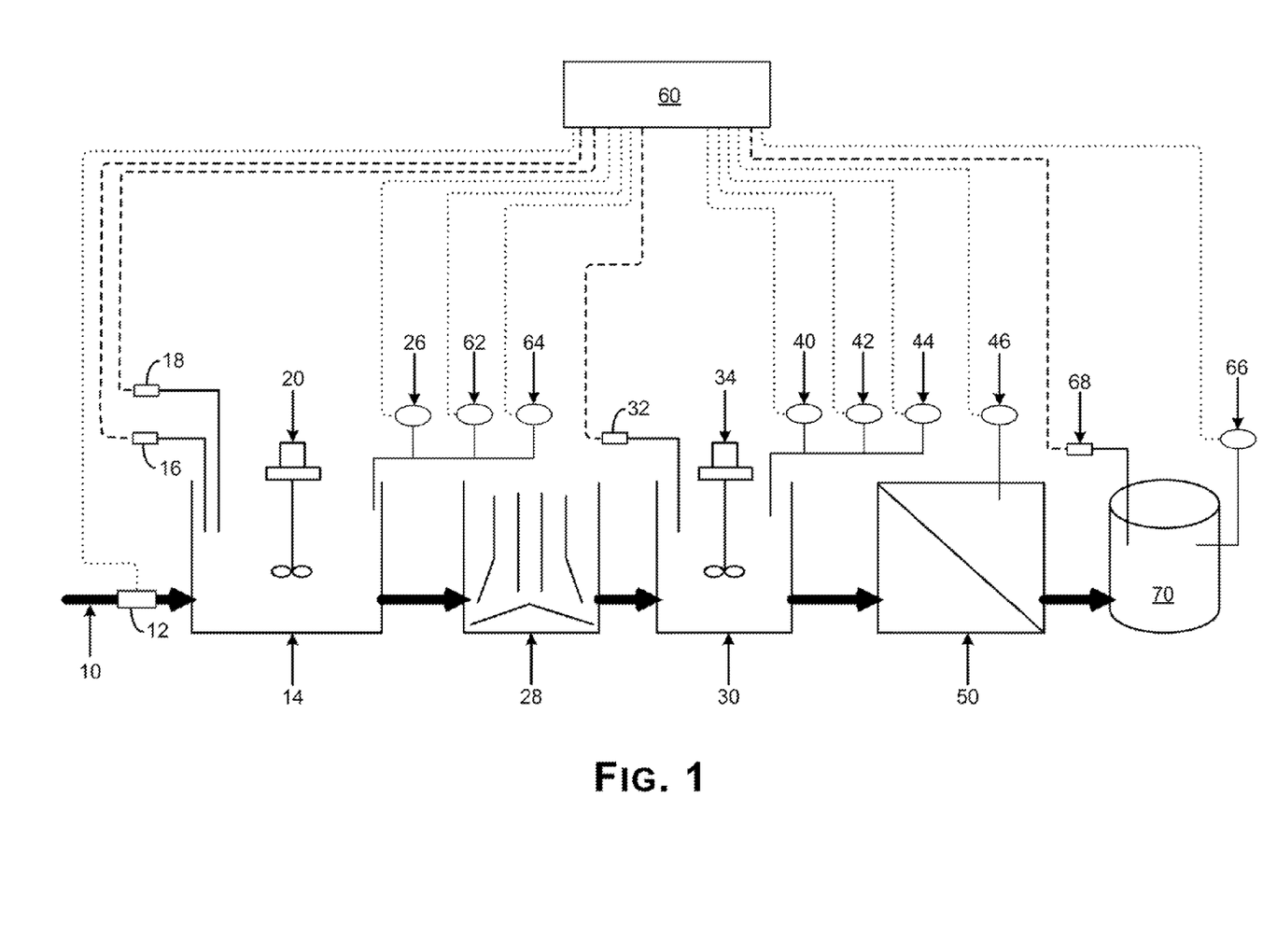
FIG. 1 is a schematic diagram of a first embodiment of the membrane filtration system of the present invention.

For example, with reference to FIG. 1, a first embodiment of a membrane filtration system of the present invention is depicted. As shown in FIG. 1, the membrane filtration system comprises a two-stage system, which enhances the total organic carbon ("TOC") removal from raw, untreated source water while maintaining optimum membrane filter performance.

In the first stage, a stream of raw untreated source water 10 is directed into a first or primary mixing tank 14 where it is dosed with a coagulant and the pH of the water is controlled such that a maximum level of TOC is removed during liquids-solids separation. When the coagulant is completely blended and the pH of the water is stabilized, the first stage water flows from the primary mixing tank 14 and passes through a mechanical clarifier 28. The clarifier 28, or liquids-solids separator, separates the chemically flocculated particulates from the water and removes them from the system. It is in this unit that chemically precipitated TOC removal occurs.

In the second stage, the particulate charge of the water is controlled to achieve optimum membrane filter performance. The first stage water flows from the clarifier 28 and is introduced into a secondary mixing tank 30. In the secondary mixing tank 30, the particulate charge of the water is monitored and the appropriate amount of acid or base is added to water to maintain an optimum charge window which matches the electromagnetic charge of the membrane surface. The optimum charge window, which is typically in the low anionic (-) range, is chosen to align with the natural surface charge of the membrane in order to reduce fouling. Thus, the electromagnetic charge of the membrane filter depends on the type of filter used. The particulate electrical charge can also be affected by factors such as turbidity increase/decrease, temperature, conductivity and the type of particulates in the water. When the particulate charge of the water is stabilized, the water flows from the secondary mixing tank 30 and passes through a low pressure membrane filter 50. The membrane filter 50 removes particulates from the water that are larger than the membrane's pore size.

In addition, the pH of the water, trans-membrane pressure ("TMP"), membrane resistance, and membrane permeability may also be monitored to prevent runaway chemical dosing. The membrane filtration system provides the final process step before the water is disinfected prior to distribution to homes and businesses. The filtered water is typically stored in a clear well into which chlorine is dosed to prevent biological growth in the water in the distribution system. Utilizing this two-stage process allows the entire filtration system to operate more effectively.

With reference again to FIG. 1, the first embodiment of the membrane filtration system of the present invention will be described in greater detail. The stream of raw untreated source water 10 is directed into a primary mixing tank 14, which is preferably a steel, fiberglass or concrete vessel. The source water 10 is then dosed with an effective amount of coagulant based upon a variety of factors such as volume, TOC level, distribution system detention and temperature.

For example, the system may include a flow meter 12, which monitors the volume of water entering the primary mixing tank 14. The system may also include a TOC analyzer 62 and UV 254 analyzer 64, which further monitor the water in the primary mixing tank 14. The TOC analyzer 62 determines the amount of TOC in the water. The UV 254 analyzer 64 provides a measurement of the portion of TOC that is most reactive to chlorine and results in the formation of disinfection byproducts ("DBP"). Both analyzers pull water from the primary mixing tank 14, filter the water and provide measurements that simulate the process of coagulation, pH adjustment and filtration. In short, the measurements are a simulation of the water that will be entering the distribution system.

A temperature sensor 44 monitors the temperature of the water in the system. While the temperature sensor 44 is shown to measure the temperature of the water in a secondary mixing tank 30 in FIG. 1, it is understood that temperature sensor 44 may comprise one or more temperature monitors located at different positions in the system. For example, temperature sensor 44 may be positioned the point of discharge from the water treatment system, the point of entry to the water treatment system, or in the primary mixing tank 14. The temperature of the water is an important variable to consider in determining the coagulant and chlorine dose since the reaction between organics and chlorine increases as the temperature increases, forming more disinfection byproducts ("DBPs") in the water.

Based upon an analysis of the variety of factors (e.g., flow volume, TOC level, and temperature), the source water 10 is then dosed with an effective amount of coagulant. As used herein, an "effective amount" of coagulant means an amount sufficient to cause precipitation of soluble TOC particulates in the water. Laboratory simulation utilizing an actual water sample can determine the amount of coagulant and pH level necessary to achieve the desired precipitation of soluble organic compounds (expressed as the % TOC removal required). For example, a water treatment plant determines through laboratory testing that a target of 40% soluble TOC removal will reduce DBP formation within limits to comply with federal limits (Stage 1 and Stage 2 DBP Rule). An effective amount of coagulant typically ranges from 1 part per million ("ppm") to 50 ppm, but may be as high as 250 ppm. A higher dose of coagulant generally results in higher TOC removal, but there is a threshold beyond which TOC removal ceases regardless of the dosage. Examples of coagulants that may be used include aluminum sulfate, polyaluminum chloride, aluminum chlorhydrate, ferric sulfate, and ferric chloride.

In a preferred embodiment, the filtration system depicted in FIG. 1 further includes a master control panel 60, which collects and analyzes inputs from the flow meter 12, TOC analyzer 62 and UV 254 analyzer 64, to determine an effective amount of coagulant to be added to the water in the primary mixing tank 14. Measurement data from the flow meter 12, TOC analyzer 62 and UV 254 analyzer 64 are typically sent to the master control panel 60 by means of wireless or hardwire electronic signal communications. Based upon input data from the flow meter 12, the temperature sensor 44, the TOC analyzer 62, and the UV 254 analyzer 64, the master control panel 60 uses a programmed algorithm to calculate an effective amount of coagulant to be added to the water in the primary mixing tank 14. The master control panel 60 then sends an electronic signal to coagulant dosing system 16 to dose an effective amount of coagulant into the primary mixing tank 14. Alternatively, the coagulant could be dosed further upstream of the primary mixing tank 14. Using this automated system for coagulant dosing provides for an accurate metering of coagulant, lowers the amount of coagulant required, and reduces operating costs by avoiding coagulant overdoses.

The pH of the water in primary mixing tank 14 is also monitored. Based upon an analysis of the pH and TOC level, an appropriate amount of acid or base is added to the water in order to enhance the precipitation of TOC from the source water.

In a preferred embodiment, the system includes a pH probe 26, which sends an electronic signal to the master control panel 60. The master control panel 60 uses the input data from the pH probe 26, the TOC analyzer 62 and the UV 254 analyzer 64 to calculate the appropriate amount of acid or base to add to the water in the primary mixing tank 14.

In accordance with the process of the present invention, the water in the primary mixing tank 14 is typically dosed with acid or base to maintain a pH of 4.0 to 6.0 standard units. Suppressing the pH of the water results in higher TOC removal because soluble TOC removal typically increases as pH is depressed. The value of pH has a profound effect in flocculation because it changes the ionic character of the organics. The charge of the organics changes in response to the concentration of positively charged hydrogen ions and negatively charged hydroxyl ions which surround them. Organics in water become more negatively charged (i.e., "anionic") as pH is increased and more positively charged (i.e., "cationic") as pH is decreased. Therefore, organic removal increases as the pH is depressed.

For example, if source water containing organics is dosed with a coagulant (acidic/cationic) at 20 ppm, X amount of flocculation/precipitation is achieved. However, if the source water is first dosed with the coagulant (acidic/cationic) at 20 ppm and then the pH of the water is depressed with an acid, higher amounts of flocculation/precipitation (e.g., X+m) can be achieved. The concentration of hydroxyl ions, which are surrounding them and the flocculated particle (precipitated metal/salt acidic coagulant), carries a positive charge, becomes more effective. Generally, soluble TOC removal increases incrementally as the pH is suppressed. However, there is a threshold beyond which TOC removal ceases regardless of pH suppression. For example, when aluminum based coagulants are used, TOC removal levels out at a pH of about 5.0 standard units, and when iron based coagulants are used, TOC removal levels out at a pH of about 4.0 standard units.

The master control panel 60 then sends an electronic signal to the primary acid/base dosing system 18 to dose the appropriate amount of acid or base into the primary mixing tank 14. Because the desired pH is low in this stage, the primary acid/base dosing system 18 will generally be required to dose an acid into the primary mixing tank 14. Examples of acids that may be used are sulfuric acid or phosphoric acid.

Figure 2:
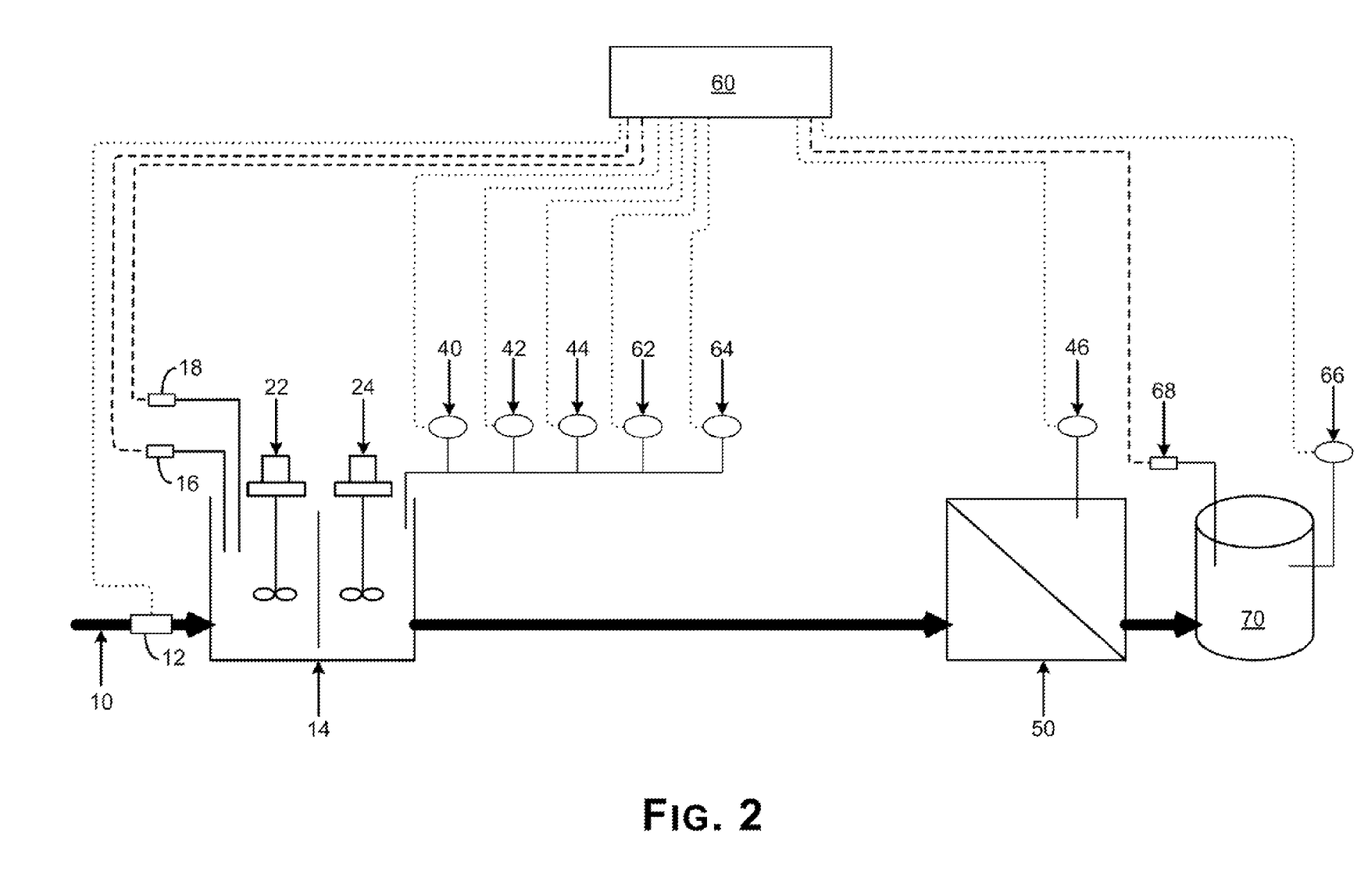
FIG. 2 is a schematic diagram of a second embodiment of the membrane filtration system of the present invention.

The water, coagulant and acid or base are then mixed in the primary mixing tank 14. The primary mixing tank 14 may comprise a single mixing zone with a single mixer 20, as shown in FIG. 1, or multiple mixing zones with multiple mixers 22, 24, as shown in FIG. 2. It is also possible to utilize the mixer in the riser tube of a solids contact clarifier thus reducing the requirement for the primary mixing system. This description demonstrates the requirement for mixing and detention. The author recognizes that there are alternate ways to achieve this without the need for this mixing tank. The mixers are preferably vertically mounted, propeller-type agitators. Referring to FIG. 2, when multiple mixing zones are utilized, the first zone contains a rapid mixer 22, which rapidly mixes the water to quickly disperse the coagulant, and the second zone containing a slower speed flocculation or maturation mixer 24, which promotes the flocculation of chemically precipitated particulates. The water remains in the primary mixing tank 14 for a sufficient time to completely blend the coagulant into the water and for the pH to stabilize at the desired point. Typical detention times in the primary mixing tank 14 range from 1 minute to 30 minutes.

Referring now to FIG. 1, when the coagulant is completely blended and the pH of the water is stabilized, the first stage water flows from the primary mixing tank 14 and passes through a mechanical clarifier 28. The clarifier 28, or liquids-solids separator, separates the chemically flocculated particulates from the water and removes them from the system. It is in this unit that chemically precipitated TOC removal occurs. The clarifier 28 may be one of several types including an inclined plate settler, a gravity clarifier, solids a contact clarifier, a sludge blanket clarifier, or a dissolved air flotation unit. Each type of clarifier has benefits depending upon the quality of the raw water source.

The water then flows from the clarifier 28 and is directed into a secondary mixing tank 30. The secondary mixing tank 30, like the primary mixing tank 14, may comprise a single mixing zone having a single mixer 34, as shown in FIG. 1, or multiple mixing zones with multiple mixers 22, 24 as shown in FIG. 2.

In the secondary mixing tank 30, the particulate charge of the water is monitored and the appropriate amount of acid or base is added to the water to maintain the optimum charge window in order to match the electromagnetic charge of the membrane surface. The optimum charge window, which is typically in the low anionic (-) range, is chosen to align with the natural surface charge of the membrane in order to reduce fouling. Thus, the target electromagnetic charge may vary depending on the type of filter used. Manufacturer of polymeric membrane filters may utilize different membrane materials (e.g., Polyvinylidene Fluoride "PVDF", poly ether sulfone "PES", etc.), which can impart differing surface charge characteristics. In addition, different manufacturing techniques will undoubtedly produce membranes with different surface charge characteristics. Because the desired electromagnetic charge range is in the low anionic range, it is generally a base that is required to be dosed. Dosing a base introduces anions into the water and affects the electromagnetic charge of the particulates by making the charge more anionic (-). Examples of bases that may be used are caustic soda or soda ash. The particulate electromagnetic charge can also be affected by factors such as turbidity increase/decrease, temperature, conductivity and the type of particulates in the water.

For example, particulates in a water source will almost always carry an anionic charge. Thus, the higher the turbidity, the higher the overall charge. In contrast, the addition of a coagulant will precipitate as a flocculated particle that carries a cationic charge. Higher or lower doses will offset against the naturally occurring anionic charges. The resulting charge is, therefore, dependent upon the naturally occurring particle charge and the "introduced" floc charge. Temperature can also alter particulate charges. As temperature decreases, overall anionic particulate charge will decrease as well. However, a micro amp streaming current monitor measures the charge of the flowing water stream regardless of turbidity, conductivity or temperature changes.

For example, in one embodiment the particulate charge of the water in the secondary mixing tank 30 is preferably monitored by a micro amp streaming current monitor 40, which displays the micro amp charge of the particulates in the water. The electromagnetic charge of the particulates may be monitored by other devices, such as a particle charge analyzer or a zeta potential analyzer. Each device measures the particulate electromagnetic charge by a different method and uses different standards and units. For example, all specific numbers given in this application refer to measurements taken by a micro amp streaming current monitor made by the Milton Roy Company. The actual numbers will vary depending on the device used to measure electromagnetic charge.

The streaming current monitor 40 sends an electronic signal to the master control panel 60, which determines the appropriate amount of acid or base to add to the water to maintain a charge of −9.8 to −9.4 micro amps. It is understood that this charge reading can vary from manufacturer to manufacturer and is dependent upon the method calibration. This optimum charge window is chosen to match the electromagnetic charge of the membrane surface. The master control panel 60 sends an electronic signal to the secondary acid/base dosing system 32 to dose the appropriate amount of acid or base into the secondary mixing tank 30.

The water and acid or base is mixed in the secondary mixing tank 30. When the particulate charge of the water is stabilized, the water flows from the secondary mixing tank 30 and passes through a low pressure membrane filter 50. The membrane filter 50 removes particulates from the water that are larger than the membrane's pore size, which is typically 0.04-0.1 microns. The membrane filtration system provides the final process step before the water is disinfected and distributed to homes and businesses. Though reference has only been made to a membrane filter, a conventional filter could also be used in accordance with the present invention.

A low pressure membrane filter operates by running in a feed pressure mode for pressure-based membrane filtration systems or a vacuum pressure mode for submerged or vacuum based membrane filtration systems. In the feed pressure mode, the membrane filtration system passes water through the membrane under direct feed pressure. In the vacuum pressure mode, the membrane filtration system pulls water through the membrane under vacuum. The filtration runs may be set by time intervals (minutes of filtration) or the runs may be determined by pressure increase or fouling.

After the water passes through the membrane filter 50, the water is stored in a clear well 70. Chlorine is dosed into the water in the clear well 70. Chlorine disinfectant is required to be introduced into a water stream prior to the distribution system to prevent biological growth or contamination of the filtered water supply. The system may further include a clear well level meter 66, which monitors the water in the clear well 70 and provides information to the master control panel 60 via an electronic signal to determine the detention time of the water in the distribution system. The detention time is important because disinfection byproduct (DBP) formation of regulated compounds such as HAA and THM occurs over time. The longer the detention time in the distribution system, the greater the formation of these regulated compounds.

The system of the present invention depicted in FIG. 1, may further include means for controlling the amount of chlorine dosed into the water in the clear well 70. For example, based upon the input signals from the temperature sensor 44, the TOC analyzer 62, the UV 254 analyzer 64 and the clear well level meter 66, the master control panel 60 may determine the amount of chlorine required to be dosed into the water in the clear well 70. The master control panel 60 sends an electronic signal to the chlorine dosing system 68 to dose the required amount of chlorine.

The system of the present invention depicted in FIG. 1, may further include a protection system, wherein the pH of the water in the secondary mixing tank 30 is monitored to ensure that the pH of the water in the secondary mixing tank 30 is maintained within an optimum pH window.

For example, in accordance with the process and system of the present invention, the pH of the water in the secondary mixing tank 30 is monitored by a pH probe 42. The pH probe 42 sends an electronic signal to the master control panel 60, which determines whether the pH of the water is within the optimum pH window. If the pH of the water is outside of the preset upper or lower pH values, which correspond to the optimum pH window, the master control panel 60 sends an electronic signal to shut off the primary and secondary acid/base dosing systems 18, 32 until a pH reading within the optimum pH window is received. Consistent with such a fail-safe system, an alarm may be triggered with the shut down of the coagulant, acid and base feed systems. In addition, the operator would typically check the entire system prior to manual restart of the system. The optimum electromagnetic charge and pH windows are dependent on the water source and the type of coagulant used. Generally, the optimum pH window is in the range of about 7.0 to 8.0 standard units, but is dependent upon the characteristics of the water and coagulant used. The optimum electromagnetic charge window can also vary slightly depending on the type of metal/salt coagulant used (e.g., aluminum or iron based).

The protection system may also include a mechanism for monitoring the performance of the membrane filter 50. When the particulate charge or pH is outside of the optimum window for most efficient membrane performance, membrane performance degrades immediately. For example, if the desired particulate charge for a given water stream is −9.7 micro amps and the corresponding pH is 7.3, and it has been determined through experimentation that temperature variations that alter particulate charge fall between a pH value of 7.1 and 7.4, a lower pH limit of 6.9 and an upper pH limit of 7.6 can be incorporated into the master control. Should the pH measurement move outside of this preset range, it is an indication that there could possibly be a problem with the amount of chemical dosing. As a fail-safe measure, the system may trigger an alarm and shut off the chemical feed.

The trans-membrane pressure ("TMP"), membrane resistance and membrane permeability may also be monitored at the membrane filter 50' by a membrane performance sensor 46. The membrane performance sensor 46 sends an electronic signal to the master control panel 60, which determines if the TMP, membrane resistance or the membrane permeability are within the preset conditions. For example, if it has been determined that under normal working conditions the system experiences an acceptable TMP rise of say 0.2 psi per day, a TMP rise rate that exceeds 0.5 psi per day would trigger an alarm and shut off chemical feed as a fail-safe measure. When the TMP, membrane resistance or membrane permeability is outside of the preset conditions, the master control panel 60 shuts down the secondary acid/base dosing system 32 until measurements within the preset conditions are received.

Controlling the particulate charge and monitoring the pH, TMP, membrane resistance, and membrane permeability in the second stage of the process increases the performance of the membrane filtration system. Specifically, advantages obtained are a higher membrane filtration rate, longer membrane filtration intervals, less membrane backwash waste and thereby water conservation, lower membrane chemical cleaning requirements, and a longer membrane life.

With reference again to FIG. 2, a second embodiment of the membrane filtration system of the present invention will be described in greater detail. The embodiment of the membrane filtration system shown in FIG. 2 comprises a single-stage or direct feed mode filtration process. In contrast to the first embodiment, the direct feed mode does not include a clarifier element. In, the direct feed mode, water bypasses the clarifier and proceeds directly to the membrane filtration system. As disclosed above in the paragraphs regarding the first stage of the two-stage process, the pH of the water can be lowered to as low as 4.5 to 5.0 standard units to achieve the highest TOC removal. However, at this pH and particulate charge level, if the water were to bypass the clarifier and be fed directly onto the membrane, the fouling rate of the membrane would increase dramatically. Therefore, in the direct feed mode, the pH and particulate charge of the water must be maintained at levels that achieve as much TOC removal as possible while optimizing membrane performance.

As shown in the FIG. 2 schematic diagram of the direct feed mode embodiment, a stream of raw untreated source water 10 is directed into a mixing tank 14 where it is dosed with an effective amount of coagulant based upon a variety of factors such as volume, TOC level and temperature. The volume may be determined by means of a flow meter 12, which monitors the volume of source water 10 flowing into the mixing tank 14. The TOC level may be determined by means of a TOC analyzer 62 and UV 254 analyzer 64 described previously. The temperature may be determined by means of a temperature sensor 44.

The particulate charge of the water in the mixing tank 14 is also monitored by means of a micro amp streaming current monitor 40. The water in the mixing tank 14 is then dosed with an appropriate amount of acid or base to maintain the particulate charge of the water within the optimum charge window for the membrane filter 50. Once the electromagnetic charge of the water in mixing tank 14 is stabilized and the coagulant is completely dispersed, the water passes through a membrane filter 50, which filters out the flocculates and insoluble particulates from the water.

The system depicted in FIG. 2 may also include a protection system for preventing runaway chemical dosing comprising a pH probe 42 to monitor the pH of the water in the mixing tank 14 and a membrane performance sensor 46, which monitors the TMP, membrane resistance and membrane permeability of the membrane. Should any of the measurements be found to be outside of preset values for pH, TMP, membrane resistance or membrane permeability is received, the system may be shut down until an acceptable measurement is received.

In a preferred embodiment of the filtration system depicted in FIG. 2, the system further includes a master control panel 60, which collects and analyzes data inputs from the flow meter 12, TOC analyzer 62 and UV 254 analyzer 64, to determine an effective amount of coagulant to be added to the water in the mixing tank 14. Measurement data from the flow meter 12, TOC analyzer 62 and UV 254 analyzer 64 are typically sent to the master control panel 60 by means of wireless or hardwire electronic signal communications. Based upon data input from the flow meter 12, the temperature sensor 44, the TOC analyzer 62, and the UV 254 analyzer 64, the master control panel 60 uses a programmed algorithm to calculate an effective amount of coagulant to be added to the water in the mixing tank 14.

For example, the flow meter 12 sends an electronic signal to a master control panel 60 regarding the volume of the water entering the mixing tank 14. The temperature sensor 44, TOC analyzer 62 and UV 254 analyzer 64 monitor the water in the mixing tank 14 and send their measurement data to the master control panel 60 via electronic signals. Based on the data from the flow meter 12, the temperature sensor 44, the TOC analyzer 62, and the UV 254 analyzer 64, the master control panel 60 uses a programmed algorithm to calculate an effective amount of coagulant to be added to the water in the mixing tank 14. The master control panel 60 then sends an electronic signal to coagulant dosing system 16, which doses an effective amount of coagulant into the mixing tank 14.

The master control panel 60 can also be used to monitor and maintain the particulate charge of the water in the mixing tank 14 within the optimum charge window. For example, the particulate charge of the water in mixing tank 14 is monitored by a micro amp streaming current monitor 40. The micro amp streaming current monitor 40 sends an electronic signal to the master control panel 60, which calculates the appropriate amount of acid or base to add to the water to maintain the particulate charge within the optimum charge window. The master control panel 60 sends an electronic signal to the acid/base dosing system 18 to dose the appropriate amount of acid or base into the mixing tank 14.

The mixing tank 14 may comprise a single mixing zone with a single mixer 20, as shown in FIG. 1, or preferably multiple mixing zones with multiple mixers 22, 24, as shown in FIG. 2 to mix the water, coagulant and acid or based thoroughly. The mixers are preferably vertically mounted, propeller-type agitators. Referring to FIG. 2, when multiple mixing zones are utilized, the first zone typically contains a rapid mixer 22, which rapidly mixes the water to quickly disperse the coagulant, and the second zone containing a slower speed flocculation or maturation mixer 24, which promotes the flocculation of chemically precipitated particulates. Once the electromagnetic charge of the water in mixing tank 14 is stabilized and the coagulant is completely dispersed, the treated water is immediately directed through the membrane filter 50, which filters out the flocculates and insoluble particulates from the water.

The master control panel 60 may also be used monitor the pH level of the water as it proceeds through the system and membrane performance data to automatically protect the filtration system from runaway chemical dosing. For example, the master control panel 60 may monitor data measurement via electronic signals from a pH probe 42, which measures the pH of the water in the primary mixing tank 14, and a membrane performance sensor 46, which measures the TMP, membrane resistance and permeability of the membrane. If a measurement outside of preset values for pH, TMP, membrane resistance or membrane permeability is received, the master control panel 60 shuts off the acid/base dosing system 18 until an acceptable measurement is received.

Following filtration by the membrane 50, the filtered water may be directed to a clear well 70 for temporary storage. A clear well level meter 66 monitors the water in the clear well 70 and provides information on the detention time of the water in the distribution system. Based on the input data from the temperature sensor 44, the TOC analyzer 62, the UV 254 analyzer 64, and the clear well level meter 66, the amount of chlorine needed may be calculated so that a chlorine dosing system 68 can dispense the necessary amount of chlorine into the clear well 70.

In a preferred embodiment, the master control panel 60 is used to monitor, calculate and dispense the amount of chlorine into the clear well 70 necessary to maintain safe drinking water. For example, the clear well level meter 66 monitors the water in the clear well 70 and provides information on the detention time of the water in the distribution system to the master control panel 60 by an electronic signal. Based upon the input data from the temperature sensor 44, the TOC analyzer 62, the UV 254 analyzer 64, and the clear well level meter 66, the master control panel 60 calculates the amount of chlorine needed and sends an electronic signal to the chlorine dosing system 68 to dose the necessary amount of chlorine into the clear well 70.

Figure 3:
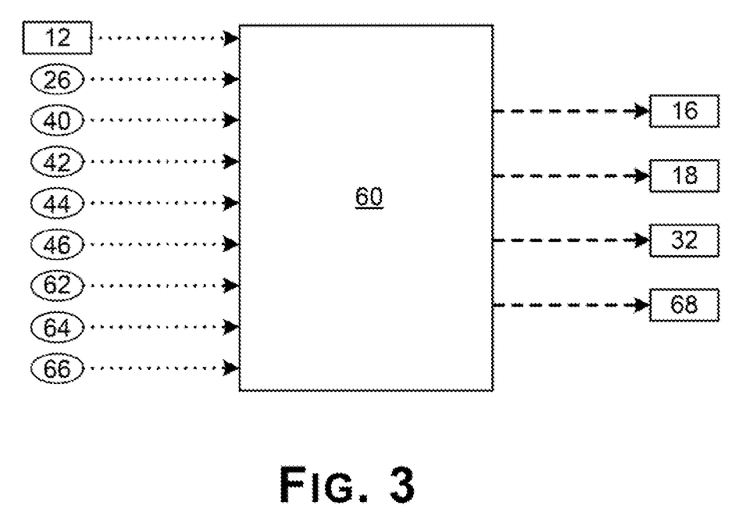
FIG. 3 is a schematic diagram of the master control panel of the membrane filtration system of the present invention.

With reference to the Figures, and particularly FIG. 3, the master control panel 60 automates the process of the present invention to control the amounts of coagulant, acid or base and chlorine that are dosed during the filtration process. Based on the input data from the analyzers throughout the process, the master control panel 60 calculates the actual coagulant dose required for TOC removal to maintain disinfection byproduct formation of haloacetic acid ("HAA") and trihalo methane ("THM") below regulatory limits. The master control panel 60 may also determine whether pH adjustment in conjunction with coagulant dosing is required, calculate the acid or base dose necessary to maintain particulate charge within the optimum charge window, and calculate the actual chlorine or disinfectant required to maintain the regulated residual limits in the distribution system.

In one embodiment, the master control panel 60 comprises a receiver for receiving electronic signals. The electronic signals are typically a 4-20 mA signal, though other means of transmission are possible. The master control panel 60 receives signals from the flow meter 12, pH probes 26, 42, temperature sensor 44, micro amp streaming current monitor 40, membrane performance sensor 46, TOC analyzer 62, UV 254 analyzer 64 and clear well level meter 66. A chlorine residual analyzer may optionally provide input signals as well.

Based on the input data, the appropriate amounts of coagulant, acid or base, and chlorine to be dosed are determined via mathematical formula or algorithm programmed into the master control panel 60. The mathematical formula or algorithm is based upon laboratory simulation that determines the TOC removal using varying coagulants (at varying concentrations) and varying levels. In addition, laboratory simulation can also be performed that simulates the formation of DBP and measures HAA and TTHM formation over time at a certain temperature. This testing and simulation, as well as the TOC removal and DBP formation "on-site", can provide the information necessary to enter into the formula/algorithm that the Master Control Panel uses to dose coagulant, set pH and dose chlorine. The master control panel's 60 transmitter then sends electronic signals to the coagulant dosing system 16, acid/base dosing systems 18, 32, and chlorine dosing system 68 to dose the appropriate amounts of the respective chemical into the water.

The master control panel 60 also protects against the possibility of overdosing acid or base in controlling pH and particulate charge. Default set points for pH, TMP, membrane resistance, and membrane permeability are stored in the master control panel 60. When measurements outside of these set points are received, the master control panel 60 is programmed to shut off acid and base dosing until acceptable measurements within the set points are obtained. For example, if the optimum membrane performance window pH is between 7.2 and 7.5 standard units, the master control panel 60 will not allow the pH dosing system to dose when the pH is measured outside of this window.

It will now be evident to those skilled in the art that there has been described herein an improved membrane filtration system and process that enhances total organic carbon removal while maintaining optimum membrane filter performance.

Although the invention hereof has been described by way of a preferred embodiment, it will be evident that other adaptations and modifications can be employed without departing from the spirit and scope thereof. For example, the above described process for maximizing TOC removal and membrane filtration performance could also include controlling other constituents in the water such as alkalinity adjustment, varying types of dual stage chemical coagulants, and powered activated carbon ("PAC") dosing. Other technologies can be added to the process such as Ion Exchange ahead of the process and Granular Activated Carbon Adsorption after the process or the process described may be a stand alone process for drinking water filtration. The flexibility of the process allows for newer types of liquids-solids clarifiers and newer, more advanced membrane materials.

The above described invention discloses a system and process for enhancing TOC removal from raw, untreated water while maintaining optimum membrane filter performance. Although the invention has been particularly shown and described, the disclosure is not intended to limit the scope of the invention. The terms and expressions employed herein have been used as terms of description and not of limitation; and thus, there is no intent of excluding equivalents, but on the contrary it is intended to cover any and all equivalents that may be employed without departing from the spirit and scope of the invention. It will be understood by those skilled in the art that various changes in form and conditions may be made therein without departing from the spirit and scope of the invention.

I claim:

1. A membrane filtration system, comprising;
   a first treatment stage, comprising:
      a first mixing tank;
      a first pH probe configured to measure a first pH level of water in the first mixing tank;
      a metering system configured to disperse an effective amount of a coagulant into the water in the first mixing tank;
      a first mechanical mixing device configured to mix the water in the first mixing tank; and
      a liquid-solid separator device, in fluid communication downstream of the first mixing tank, configured to receive water from the first mixing tank;
   a second treatment stage, comprising:
      a second mixing tank, the second mixing tank in fluid communication downstream of the liquid-solid separator device and configured to receive water that has passed through the liquid-solid separator device;
      a second pH probe configured to measure a second pH level of water in the second mixing tank;
      a micro-amp streaming current monitor configured to measure a particulate charge of water in the second tank;
      a second mechanical mixing device configured to mix the water in the second mixing tank; and
      a membrane filter, in fluid communication downstream of the second mixing tank, configured to receive water from the second mixing tank; and
   a pH set point control system, in communication with the first pH probe, the second pH probe, and the micro-amp streaming current monitor, configured to:
      adjust the first pH level of the water in the first mixing tank, prior to the water being directed through the liquid-solid separator device, to a first pH set point selected for optimum TOC removal in response to a first signal from the first pH probe; and adjust the second pH level of the water in the second mixing tank, prior to the water being directed through the membrane filter, to a second pH set point selected to align the particulate charge of the water with an electromagnetic surface charge of the membrane filter, in response to a second signal from the second pH probe and a third signal from the micro-amp streaming current monitor.

2. The system of claim 1, wherein the effective amount of coagulant is based upon at least one of a TOC level of the water, a volume of the water, a temperature of the water, and an optimum charge window for the membrane filter.

3. The system of claim 1, configured to suppress a pH level of the water prior to coagulant dispersion.

4. The system of claim 1, configured to monitor a trans-membrane pressure of the membrane filter, and to prevent the water from being directed through the membrane filter when the trans-membrane pressure exceeds a predetermined value.

5. The system of claim 1, wherein the first pH set point is about 4 to 6.0 and the second pH set point is about 7.0 to 8.0.

6. The system of claim 1, wherein the pH set point control system comprises a first acid/base dosing system in fluid communication with the first mixing tank and a second acid/base dosing system in fluid communication with the second mixing tank.

7. The membrane filtration system of claim 1, wherein the first treatment stage further comprises a flow meter for determining a flow rate of water flowing into the first mixing tank, and wherein the metering system for dispersing the coagulant is configured to determine the effective amount of coagulant to dose based upon the flow rate of the water flowing into the first mixing tank.

8. The system of claim 1, wherein the coagulant is an aluminum or iron metal salt based coagulant.

9. The system of claim 1, wherein the liquid-solid separator device is selected from the group consisting of a plate separator, a sedimentation tank, a solids-contact clarifier, an ion exchange unit and a dissolved air flotation unit.

10. The system of claim 1, further comprising an ion exchange operation upstream of the first treatment stage.

11. The system of claim 1, further comprising a disinfection or a granular activated carbon adsorption operation downstream of the second treatment stage.

12. The system of claim 1, configured such that the water may bypass a clarification operation.

13. A membrane filtration system, comprising:
a mixing tank;
a pH probe configured to measure a pH level of water in the mixing tank;
a micro-amp streaming current monitor configured to measure a particulate charge of water in the mixing tank;
a metering system configured to disperse an effective amount of a coagulant into the water upstream of, or in, the mixing tank;
a mechanical mixing device configured to mix the water in the mixing tank;
a membrane filter in fluid communication downstream of the mixing tank configured to receive water from the mixing tank; and
a pH set point control system, in communication with the pH probe and the micro-amp streaming current monitor, configured to:
adjust the pH level of the water in the mixing tank, prior to the water being directed through the membrane filter, to a pH set point selected to align the particulate charge of the water with an electromagnetic surface charge of the membrane filter, in response to a first signal from the pH probe and a second signal from the micro-amp streaming current monitor.

14. The system of claim 13, wherein the effective amount of coagulant is based upon at least one of a TOC level of the water, a volume of the water, a flow rate of the water, a temperature of the water, and an optimum charge window for the membrane filter.

15. The system of claim 13, configured to monitor a trans-membrane pressure of the membrane filter, and to prevent the water from being directed through the membrane filter when the trans-membrane pressure exceeds a predetermined value.

16. The system of claim 13, wherein the coagulant is an aluminum or iron metal salt based coagulant.

17. The system of claim 13, wherein the pH set point is about 7.0 to 80.

* * * * *